United States Patent Office 3,028,369
Patented Apr. 3, 1962

3,028,369
ISOCYANATE CATALYZED POLYMERIZATION OF LACTAMS
John M. Butler, Ross M. Hedrick and Edward H. Mottus, Dayton, Ohio, assignors to Monsanto Chemical Company, St. Louis, Mo., a corporation of Delaware
No Drawing. Filed July 21, 1958, Ser. No. 749,658
20 Claims. (Cl. 260—78)

This invention relates to the preparation of polyamides. More specifically, this invention relates to improved methods for polymerizing lactams.

The formation of polyamides by polymerization of lactams having at least 7 atoms in the lactam ring is well known. (See, for example, U.S. 2,071,253 and U.S. 2,251,519.) Several different kinds of materials are effective catalysts for this polymerization. One of the better catalyst types comprises the alkali and alkaline earth metal catalysts. These metals are effective either in the metallic form or in the form of hydrides, borohydrides, oxides, hydroxides, carbonates, amides, etc. Also useful are the organo-metallic compounds of these metals such as the lithium, potassium and sodium alkyls, e.g., butyl lithium, and the aryl compounds of such metals, such as sodium phenyl. The polymerization is generally carried out at relatively high temperatures, e.g., from around 225° C. to about 260° C., with a catalyst concentration ranging anywhere from a fraction of 1% to as much as 15 or 20%, based upon the quantity of lactam monomer to be polymerized.

Lactams having fewer than 7 atoms in the lactam ring can also be polymerized with the aforementioned catalysts. The polymerization of the smaller ring lactams (e.g., pyrrolidone, piperidone, morpholone, $\gamma$-valerolactam, $\delta$-valerolactam, $\gamma$-caprolactam, etc.) is much more difficult than polymerization of the larger ring lactams, and it was only relatively recently that the conditions for polymerization of the former were first discovered. The principal differences between the polymerization of the small ring lactams and the polymerization of the larger ring lactams is that the former must be carried out at lower temperatures, e.g., 0° C. to about 180° C. The anionic polymerization of the lactams must be carried out in the absence of water. Thus, if the alkali or alkaline earth metal catalyst is utilized in the form of the metal hydroxide (which will first react with the lactam to form water as a by product), then the water must be removed from the reaction mixture before polymerization can be carried out.

It has now been found that the above-described polymerization of lactams (either small ring or large ring) can be markedly enhanced by the addition of an organic isocyanate used as an initiator or promoter. The benefits derived from such use of isocyanates are manifested in at least two different ways. For example, in the case of the lactams of higher amino acids (e.g., 7 or more atoms in the lactam ring), polymerizations which were previously carried out at temperatures of 225° C. to 260° C. can now be carried out equally well or even better at 150° C. or lower. In general temperatures above about 200° C. have been required to effect polymerization of the higher lactams such as $\epsilon$-caprolactam. Accordingly, it is seen that the instant process provides a means to effect polymerization of the higher lactams at temperatures below 200° C. It will be understood that the presence of the organic isocyanate initiator will also materially accelerate the polymerization of the higher lactams at higher temperatures within the range of the prior art processes. Thus, the instant process is not strictly limited to temperatures below 200° C., but preferably temperatures of from about 130° C. to about 200° C. and more preferably still temperatures of from about 130° C. to about 160° C. are employed for the polymerization of the higher lactams such as $\epsilon$-caprolactam. In the case of the lactams of lower amino acids (e.g., 6 or less atoms in the lactam ring) conversions of 80% or better can be obtained under conditions which give only about 20% conversion without the isocyanate promoters. These promoters are very useful in controlling the polymerization, especially with respect to molecular weight. For example, at low promoter concentration ranges an increase in such concentration will give both increased conversion to polymer and increased molecular weight of said polymer. In the higher promoter concentration ranges (at which the reaction approaches complete conversion) further increases in promoter concentration will give decreasing molecular weight polymers.

As isocyanate compounds suitable for use according to the process of the invention, there may be mentioned alkyl isocyanates, such as methyl isocyanate, ethyl isocyanate, n-propyl isocyanate, isopropyl isocyanate, n-butyl isocyanate, sec-butyl isocyanate, and higher homologs thereof; aryl isocyanates, such as phenyl isocyanate, tolyl isocyanates, xylyl isocyanates, ethylphenyl isocyanates, phenethyl isocyanate, p-diphenyl isocyanate, etc.; diisocyanates such as p-phenylene diisocyanate, 2,4-tolylene diisocyanate, di(p-isocyanatophenyl)methane, 2,2-di(p-isocyanatophenyl)propane, p,p′ - diisocyanatodiphenyl, ethylene diisocyanates, N,N-di(isocyanatoethyl)amine, etc.; tri- and polyisocyanates such as 1,3,5-triisocyanatobenzene, 1,3,8-triisocyanatonaphthalene, tri(p-isocyanatophenyl)methane, 4-(p-isocyanatobenzyl)-1,3-phenylene diisocyanate, 2,5-di(p-isocyanatophenyl)phenyl isocyanate, 2,4-di(p-isocyanatobenzyl)phenyl isocyanate, etc. Because of their more ready availability and greater simplicity, the hydrocarbyl isocyanates are generally preferred materials. However, heterocyclic isocyanates or isocyanates substituted with or containing other radicals or groups such as carbonyl, carbamyl, alkoxy, ether, sulfonyl, t-amino, or any other non-interfering groups (i.e., groups which will not preferentially react with the lactam to be polymerized, or which will not otherwise interfere with the essential effective activity of the isocyanate promoter or polymerization catalysts) will also be suitable promoters for use according to the present invention.

The concentration of the promoter utilized should be between about 0.1 mole percent and about 5 mole percent, based upon the lactam being polymerized. The most effective concentration range lies between about 0.5 mole percent and about 2 mole percent of the lactam, although under some circumstances (for example, when an unusually low molecular weight polymer is desired) concentrations outside of the above-stated ranges can be advantageously used.

Further details will be apparent from the following examples, which are illustrative of the markedly outstanding effectiveness of the isocyanate promoters described herein.

*Example 1*

Seventeen and seven-tenths grams of 2-pyrrolidone having 1 weight percent of sodium hydride dissolved therein was placed in a closed flask and purged with dry nitrogen to remove water vapor and air. The reaction mixture was left blanketed with nitrogen and allowed to stand overnight (18 to 24 hours) at about 36° C. The resulting reaction mass was mixed with about four times its volume of water in a Waring Blendor. The water and water-soluble monomer were then filtered from the water insoluble polypyrrolidone. The precipitate was washed twice with water, dried at 110° C. for about 4 hours and weighed. The quantity of polypyrrolidone product obtained was 3.4 grams (19.2% conversion).

Example 2

The procedure of Example 1 was duplicated with 22 grams of 2-pyrrolidone containing 1 weight percent of sodium hydride and 0.18 cc. (about 1.0 mole percent) of ethyl isocyanate. The quantity of polypyrrolidone product obtained was 18.8 grams (85% conversion).

Example 3

The procedure of Example 2 was duplicated except that 0.4 gram of m-chlorophenyl isocyanate (1 mole percent) was used in place of the ethyl isocyanate. The quantity of polypyrrolidone recovered was 17.8 grams (81% conversion).

Example 4

The procedure of Example 2 was duplicated except that 0.45 gram (1 mole percent) of 2,4-tolylene diisocyanate was used in place of the ethyl isocyanate and was added to the 2-pyrrolidone before the addition of the sodium hydride catalyst. The quantity of polypyrrolidone recovered was 18.2 grams (83% conversion).

Example 5

To a solution of 0.87 gram of 2,4-tolylene diisocyanate in 113 grams of ε-caprolactam at 100° C., there was added 0.1 gram of sodium hydride. As soon as the sodium hydride had dissolved, the temperature was raised to 160° C. By the time the temperature had reached 120° C. (about 10 minutes after the sodium hydride had dissolved), the caprolactam had polymerized to a completely solid mass. The solid was maintained at 160° C. for 3 hours, cooled, broken up into small pieces, leached in hot water for 1 hour to remove unreacted caprolactam monomer and dried for 4 hours at 110° C. in an air circulating oven. The conversion to polycaprolactam was 97%.

Example 6

The procedure of Example 5 was duplicated except that 1.25 grams (0.5 mole percent) of di(p-isocyanatophenyl)-methane was used instead of the 2,4-tolylene diisocyanate and the polymerization was carried out at 160° C. for 2 hours. The conversion to polycaprolactam was 98.5%.

Example 7

Eleven and seven-tenths grams of the reaction product of one molar proportion of polypropylene glycol (molecular weight 2025) with two molar proportions of 2,4-tolylene diisocyanate was dissolved in 110 grams of ε-caprolactam at 100° C., and 0.1 gram of sodium hydride catalyst was added thereto. After 2 hours the mass (which had solidified in about 45 minutes) was broken up, leached in boiling water for 1 hour, cooled, filtered, washed with acetone and dried overnight at 110° C. The conversion to polycaprolactam was 86.5%.

Example 8

A mixture of 113 grams of ε-caprolactam, 0.1 gram of sodium hydride and 0.405 gram of ethyl isocyanate was melted at 100° C. under a nitrogen atmosphere. The temperature was then raised to 160° C. By the time the temperature had reached 150° C. (about 11 minutes), the mixture had completely solidified. The solid product was held at 160° C. for 12 hours, cooled, broken into small pieces, leached in hot water for 1 hour, filtered, washed with water and acetone, and dried for 4 hours at 110° C. in an air circulating oven. The conversion to polycaprolactam was 99%.

In contrast to the isocyanate-promoted caprolactam polymerizations described in the preceding Examples 5 through 8, attempts to polymerize caprolactam in the same manner but in the absence of the isocyanate promoters result in no detectable formation of polymer at 160° C., even after as long as 48 hours.

This application is a continuation-in-part of our co-pending application Serial No. 599,338, filed July 23, 1956, now abandoned.

We claim:

1. In the catalyzed polymerization of lactams of a monoaminomonocarboxylic acid, wherein said lactams are characterized by the presence of a single amide group in the lactam ring, with a member selected from the group consisting of alkali and alkaline earth metal catalysts, the improvement which comprises carrying out said catalyzed polymerization under substantially anhydrous conditions in the additional presence of from about 0.1 to about 5 mole percent, based upon the lactam being polymerized, of an organic isocyanate, free from other substituents which will react with the lactam.

2. The process of claim 1, wherein the lactam is ε-caprolactam.

3. The process of claim 1, wherein the lactam is pyrrolidone.

4. The process of claim 1, wherein the polymerization temperature is from about room temperature up to about 260° C.

5. The process of claim 1, wherein the polymerization temperature is from about room temperature up to about 200° C.

6. In the catalyzed polymerization of lactams of a monoaminomonocarboxylic acid, wherein said lactams are characterized by the presence of a single amide group in the lactam ring, with a member selected from the group consisting of alkali and alkaline earth metal catalysts, the improvement which comprises carrying out said catalyzed polymerization under substantially anhydrous conditions in the additional presence of from about 0.1 to about 5 mole percent, based upon the lactam being polymerized, of an organic isocyanate, free from other substituents which will react with the lactam, at a polymerization temperature of from about room temperature up to about 160° C.

7. The process of claim 6, wherein the isocyanate is a hydrocarbyl isocyanate.

8. The process of claim 6, wherein the isocyanate is an aryl isocyanate.

9. The process of claim 6, wherein the isocyanate is an alkyl isocyanate.

10. The process of claim 6, wherein the isocyanate is di(p-isocyanatophenyl)methane.

11. The process of claim 10, wherein the lactam is ε-caprolactam.

12. The process of claim 10, wherein the lactam is pyrrolidone.

13. In the catalyzed polymerization of ε-caprolactam with an alkali metal catalyst, the improvement which comprises promoting said catalyzed polymerization under substantially anhydrous conditions with from about 0.1 to about 5 mole percent, based upon the ε-caprolactam being polymerized, of ethyl isocyanate at a polymerization temperature of from about 100° C. up to about 160° C.

14. In the catalyzed polymerization of pyrrolidone with an alkali metal catalyst, the improvement which comprises promoting said catalyzed polymerization under substantially anhydrous conditions with from about 0.1 to about 5 mole percent, based upon the pyrrolidone being polymerized, of ethyl isocyanate at a polymerization temperature of from about room temperature up to about 160° C.

15. In the catalyzed polymerization of ε-caprolactam with an alkali metal catalyst, the improvement which comprises promoting said catalyzed polymerization under substantially anhydrous conditions with from about 0.1 to about 5 mole percent, based upon the ε-caprolactam being polymerized, of 2,4-tolylene diisocyanate at a polymerization temperature of from about 100° C. up to about 160° C.

16. The process of claim 1, wherein the lactam is ε-caprolactam and the polymerization temperature is from about 130° C. to about 200° C.

17. The process of claim 16, wherein the isocyanate is ethyl isocyanate.

18. The process of claim 16, wherein the isocyanate is 2,4-tolylene diisocyanate.

19. The process of claim 16, wherein the isocyanate is di(p-isocyanatophenyl)methane.

20. The process for producing a polyamide from epsilon-caprolactam which comprises heating under substantially anhydrous conditions a mixture of said lactam, a catalytic amount of a lactam polymerization catalyst selected from the group consisting of alkali metal catalyst and alkaline earth metal catalyst and a catalytic amount of an accelerator of the formula RNCO, where R is a monovalent hydrocarbon radical, said heating being carried out at polymerization temperatures higher than about 120° C.

References Cited in the file of this patent
UNITED STATES PATENTS

| | | |
|---|---|---|
| 2,241,321 | Schlack | May 6, 1941 |
| 2,638,463 | Ney et al. | May 12, 1953 |